United States Patent [19]
Nomoto

[11] Patent Number: 5,621,719
[45] Date of Patent: Apr. 15, 1997

[54] OPTICAL DISK AND APPARATUS FOR REPRODUCING THE SAME

[75] Inventor: Takayuki Nomoto, Tsurugashima, Japan

[73] Assignee: Pioneer Electronic Corporation, Tokyo-to, Japan

[21] Appl. No.: 394,824

[22] Filed: Feb. 27, 1995

[30] Foreign Application Priority Data

Mar. 3, 1994 [JP] Japan ..................................... 6-033897

[51] Int. Cl.$^6$ ..................................................... G11B 7/24
[52] U.S. Cl. .................................. 369/275.3; 369/275.4; 369/110
[58] Field of Search ........................... 369/275.3, 275.4, 369/110, 109, 111

[56] References Cited

U.S. PATENT DOCUMENTS

| | | | |
|---|---|---|---|
| 5,331,623 | 7/1994 | Matoba et al. | 369/275.3 X |
| 5,493,552 | 2/1996 | Kobori | 369/109 |
| 5,495,460 | 2/1996 | Haraguchi et al. | 369/275.3 X |

*Primary Examiner*—David C. Nelms
*Assistant Examiner*—Huan Hoang
*Attorney, Agent, or Firm*—Kane, Dalsimer, Sullivan, Kurucz, Levy, Eisele and Richard, LLP

[57] ABSTRACT

An optical disk includes: an information recording surface; first surface-transformed portion array formed on the information recording surface and including first surface-transformed portions transformed in shapes, the first surface-transformed portion reflecting a laser light, when it is irradiated thereon, polarized in accordance with the transformed shape thereof so that major axis of the polarized light is oriented to a first direction; and second surface-transformed portion array formed on the information recording surface and including second surface-transformed portions transformed in shapes, the second surface-transformed portion reflecting a laser light, when it is irradiated thereon, polarized in accordance with the transformed shape thereof so that major axis of the polarized light is oriented to a second direction. The first surface-transformed portion array and the second surface-transformed portion array are formed alternately in a radial direction of the optical disk, and the first direction and the second direction differ from each other by 45 degrees.

8 Claims, 10 Drawing Sheets

OPTICAL DISK AND APPARATUS FOR REPRODUCING THE SAME

BACKGROUND OF THE INVENTION

1. Field of the Invention

This invention relates to an optical disk and an apparatus for reproducing information from the optical disk.

2. Description of the Prior Art

Figure 1:
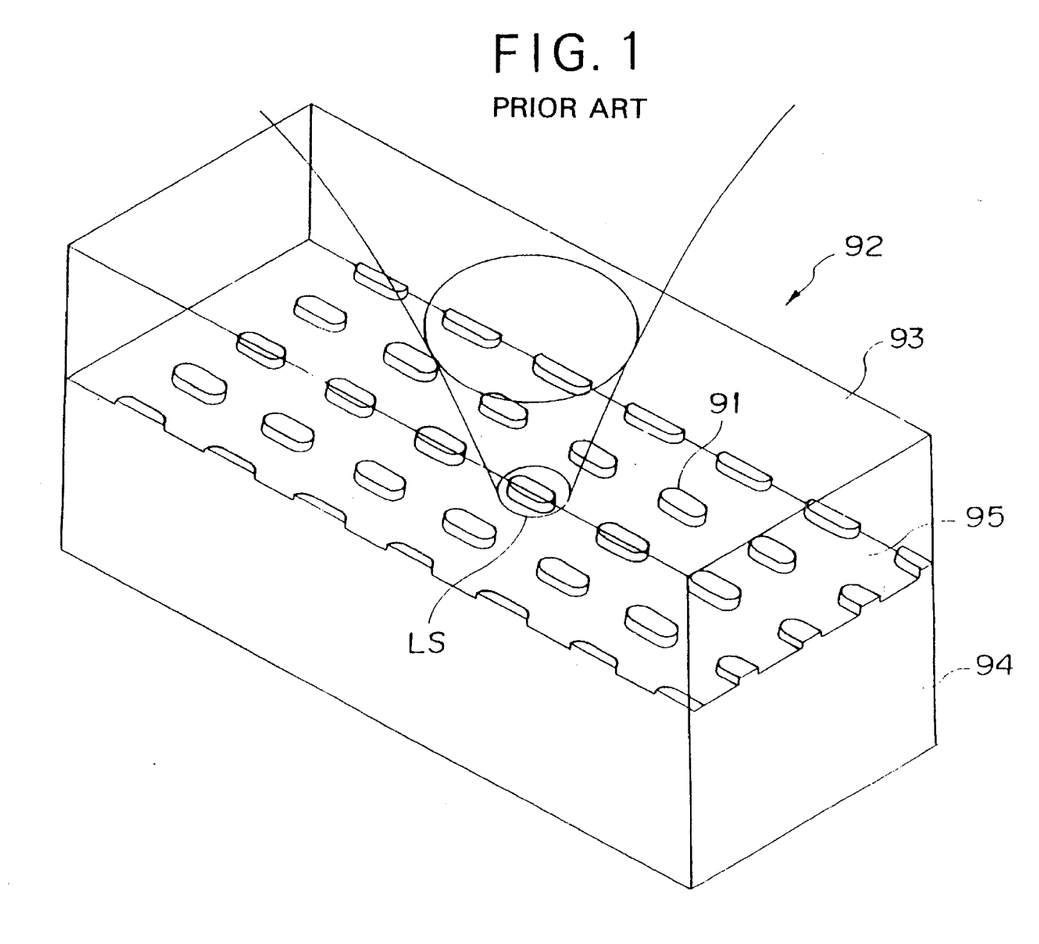
FIG. 1 is a perspective view illustrating surface of an optical disk.

FIG. 1 illustrates a construction of a known optical disk on which audio information and/or video information is recorded. In FIG. 1, reference numeral 93 denotes substrate and reference numeral 94 denotes protection layer. Information to be recorded is converted into signals, the value of which corresponding to pit lengths used as parameters, and the signals are recorded on information recording surface 95 as information pits 91. In reproduction, a laser light is converged on information pits 91 to form a light spot LS having a predetermined diameter, and reflected and diffracted light beam is detected by photodetector, such as photodiode, to produce electric signal. The electric signal is subjected to a conversion reverse to the conversion carried out in recording process to obtain original audio information or video information recorded on the disk 92. As examples of such an optical disk, Compact Disk (CD) and Laser Disk (LD) are known.

Figure 2:
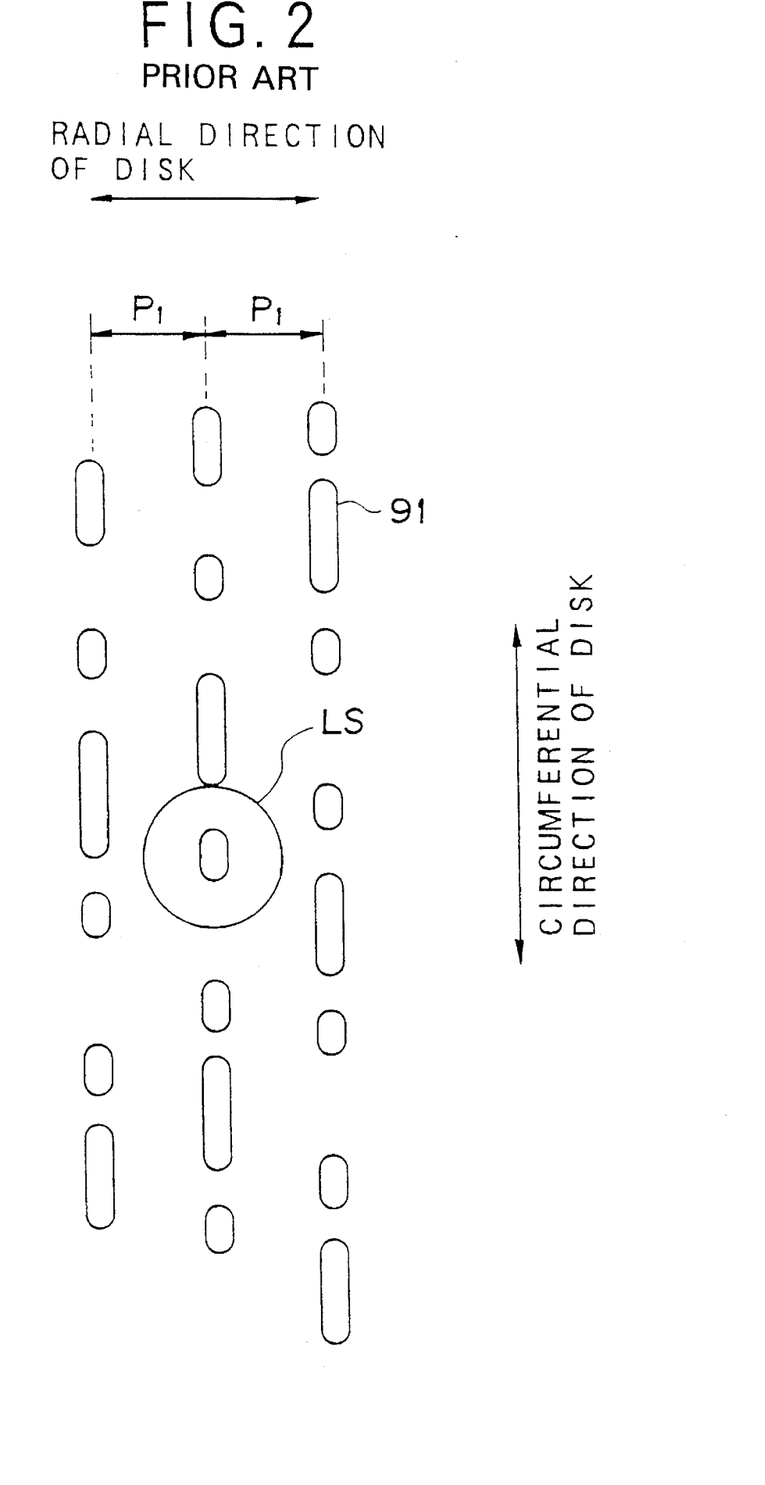
FIG. 2 is a view illustrating track pitch.

As described above, as to a known optical disk, reading light beam is irradiated on disk and recorded information is read out based on variation in quantity of reflected light according to presence or absence of information pits. Information recording density of those optical disks are defined and limited by track pitch. As shown in FIG. 2, track pitch $P_1$ is an interval between neighboring tracks which define center-lines of arrays of information pits 91. Recently, in order to increase recording density of optical disk, various measures for reducing track pitch have been developed and proposed.

Figure 3:
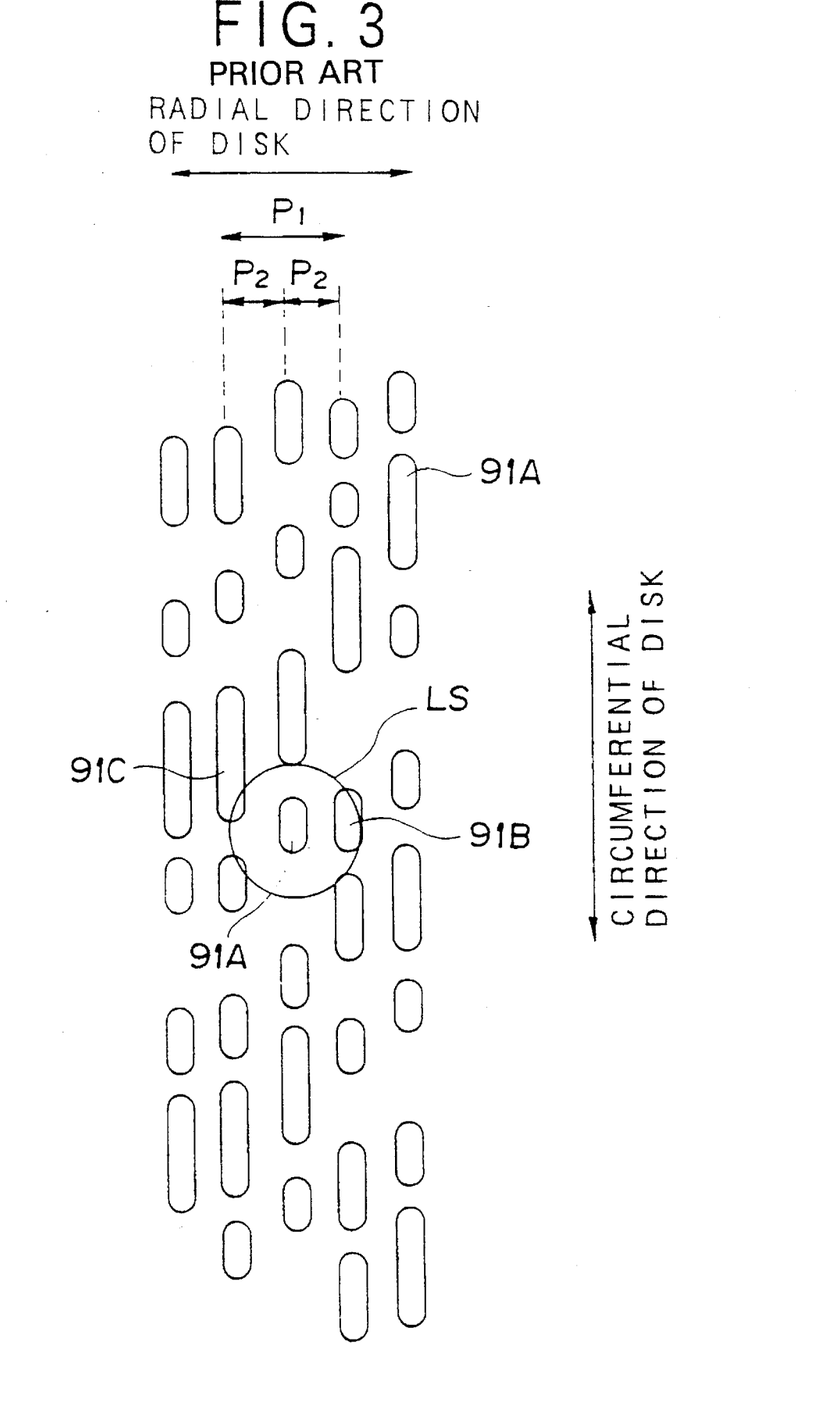
FIG. 3 is a view illustrating a case in which track pitch is half of that in FIG. 2.

However, when track pitch is simply reduced, to a value $P_2$ smaller than conventional value $P_1$ ($P_2=P_1/2$) for example, as illustrated in FIG. 3, light spot LS of laser light covers not only target information pit 91A to be read-out but also information pits 91B and 91C on neighboring tracks. This trial is hopeless in practice because reproduced signal includes crosstalk (intermixture of signals from neighboring tracks) too much. Namely, in order to reduce crosstalk, track pitch must be large enough compared with a diameter of light spot LS. This is a bar against increasing recording density.

In the above view, in order to improve recording density, various methods for reducing diameter of light spot of laser beam has been proposed. In general, radius W of light spot LS is expressed as follows:

$$W=\alpha \times \lambda/NA \quad (\alpha\text{:constant}).$$

Here, NA is numerical aperture of objective lens, and $\lambda$ is wavelength of laser light. Accordingly, in order to reduce diameter W of laser light, wavelength $\lambda$ should be reduced, or alternatively numeral aperture NA should be increased. However, improvement of wavelength $\lambda$ and numerical aperture NA has technological limitation at present, and hence it is hopeless to improve recording density greatly.

SUMMARY OF THE INVENTION

It is an object of the present invention to provide an optical disk of high recording density.

It is another object of the present invention to provide an apparatus for reproducing information from the above optical disk.

According to one aspect of the present invention, there is provided an optical disk including: an information recording surface; first surface-transformed portion array formed on the information recording surface and including first surface-transformed portions transformed in shapes, the first surface-transformed portion reflecting a laser light, when it is irradiated thereon, polarized in accordance with the transformed shape thereof so that major axis of the polarized light is oriented to a first direction; and second surface-transformed portion array formed on the information recording surface and including second surface-transformed portions transformed in shapes, the second surface-transformed portion reflecting a laser light, when it is irradiated thereon, polarized in accordance with the transformed shape thereof so that major axis of the polarized light is oriented to a second direction. The first surface-transformed portion array and the second surface-transformed portion array are formed alternately in a radial direction of the optical disk, and the first direction and the second direction differ from each other by 45 degrees.

According to another aspect of the present invention, there is provided an apparatus for reproducing information from an optical disk. The disk includes: an information recording surface; first surface-transformed portion array formed on the information recording surface and including first surface-transformed portions transformed in shapes, the first surface-transformed portion reflecting a laser light, when it is irradiated thereon, polarized in accordance with the transformed shape thereof so that major axis of the polarized light is oriented to a first direction; and second surface-transformed portion array formed on the information recording surface and including second surface-transformed portions transformed in shapes, the second surface-transformed portion reflecting a laser light, when it is irradiated thereon, polarized in accordance with the transformed shape thereof so that major axis of the polarized light is oriented to a second direction. The first surface-transformed portion array and the second surface-transformed portion array being formed alternately in a radial direction of the optical disk, and the first direction and the second direction differing from each other by 45 degrees. The apparatus includes: laser light irradiating unit for irradiating the laser light onto the information recording surface; light separating unit for separating the polarized light reflected by the information recording surface into the polarized light having major axis oriented to the first direction and the polarized light having major axis oriented to the second direction; first photodetecting unit for detecting, from the polarized light having major axis oriented to the first direction, light component of the first direction and light component of a direction perpendicular to the first direction; second photodetecting unit for detecting, from the polarized light having major axis oriented to the second direction, light component of the second direction and light component of a direction perpendicular to the second direction; first operation unit for obtaining information recorded on the first surface-transformed portion array from the light components detected by the first photodetecting unit; and second operation unit for obtaining information recorded on the second surface-transformed portion array from the light components detected by the second photodetecting unit.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENT

In the present invention, recorded information is detected utilizing such a phenomenon that polarization state of reflected light beam is varied according to shapes of surface of disk, e.g., information pits. A reference "Zero-reflectivity high spatial-frequency rectangular-groove dielectric surface-relief gratings" (APPLIED OPTICS vol. 25 no. 24 86-12-15) teaches that when reading light beam is irradiated on diffraction gratings having period equal to or less than the wavelength of the light beam, reflective light quantities of p-polarization and s-polarization are varied. The present invention utilizes this phenomenon. Namely, arrays of information pits spirally arranged may be regarded as two-dimensionally grouped array, and recorded information is detected based on variation of polarization states according to shapes of information pits.

Next, preferred embodiments of the present invention will be described below with reference to the accompanying drawings.

Figure 4A:
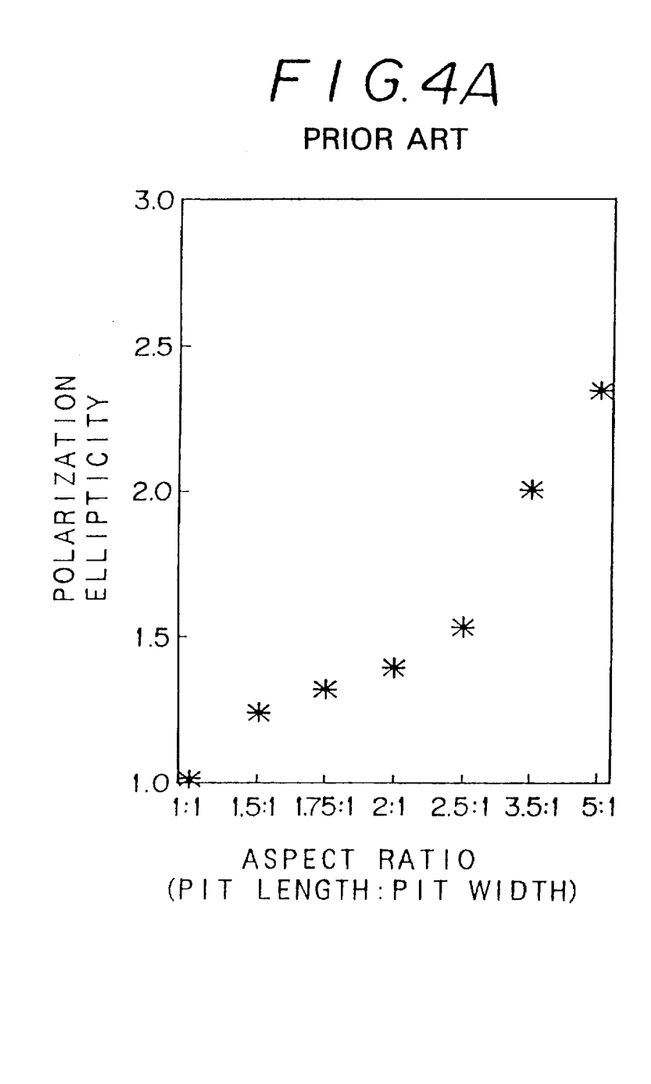
FIG. 4A is a diagram illustrating a variation of ellipticity of elliptically-polarized light depending upon aspect ratio of information pit.
Figure 4B:
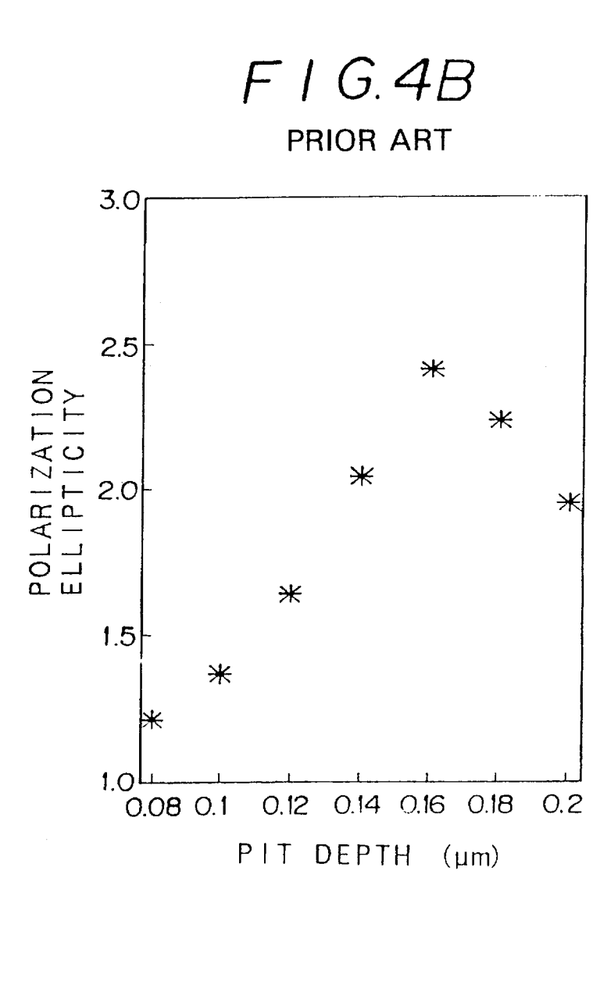
FIG. 4B is a diagram illustrating a variation of ellipticity of elliptically-polarized light depending upon pit depth.
Figure 5A:
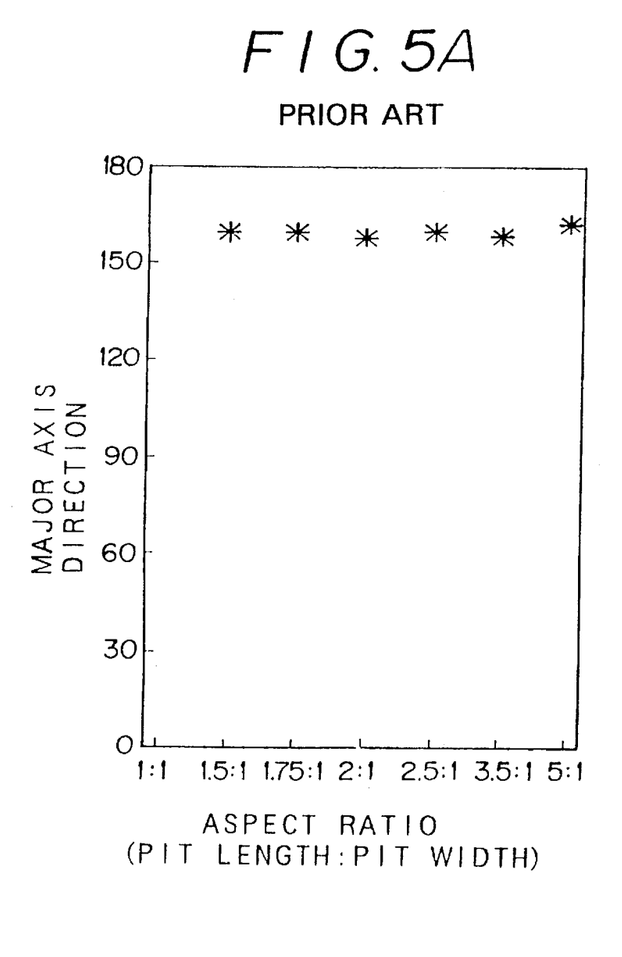
FIG. 5A is a diagram illustrating a variation of direction of major axis of elliptically-polarized light depending upon aspect ratio of information pit.
Figure 5B:
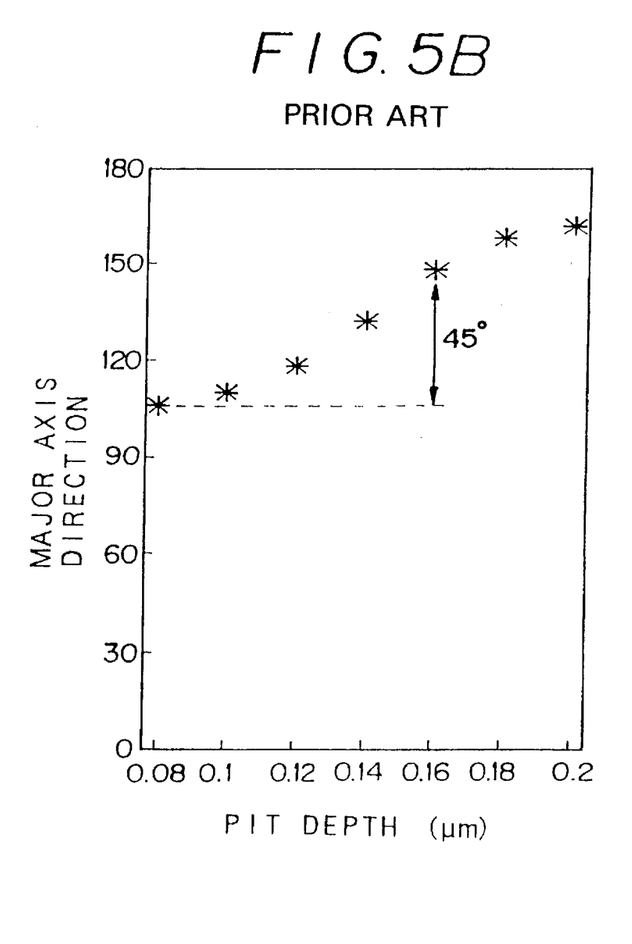
FIG. 5B is a diagram illustrating a variation of direction of major axis of elliptically-polarized light depending upon pit depth.

Firstly, an optical disk according to the present invention will be described. As mentioned above, polarization state of light beam reflected by the optical disk varies depending on shapes of information pits formed on the optical disk. FIG. 4A illustrates a variation of ellipticity of elliptically-polarized light according to aspect ratio of information pit (i.e., ratio of pit length to pit width), and FIG. 4B illustrates a variation of ellipticity of elliptically-polarized light according to pit depth. FIG. 5A illustrates a variation of direction of major axis of elliptically-polarized light according to aspect ratio of information pit, and FIG. 5B illustrates a variation of direction of major axis of elliptically-polarized light according to pit depth. It is noted that, in the following description, an ellipticity of elliptically-polarized light may be referred to as "polarization ellipticity" and a major axis of elliptically-polarized light may be simply referred to as "major axis". FIGS. 4A and 4B teach that polarization ellipticity is dependent upon both aspect ratio and pit depth, and FIGS. 5A and 5B teach that major axis direction is independent of aspect ratio but is dependent upon pit depth. The present invention utilizes these relationships.

Figure 6A:
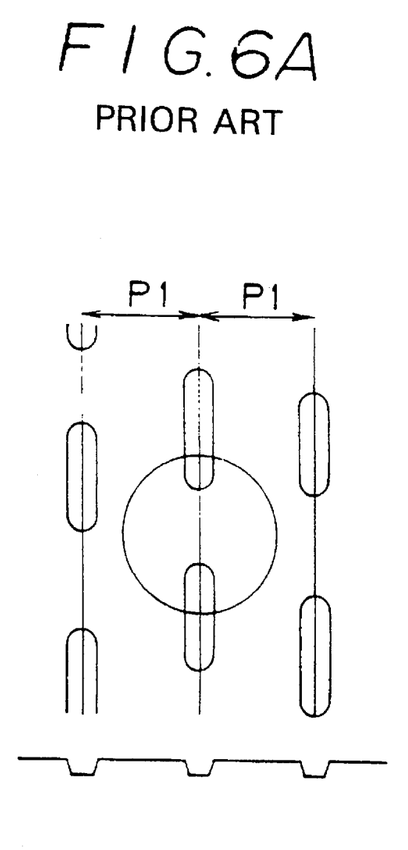
FIG. 6A is a view illustrating pit arrangement of a conventional optical disk.
Figure 6B:
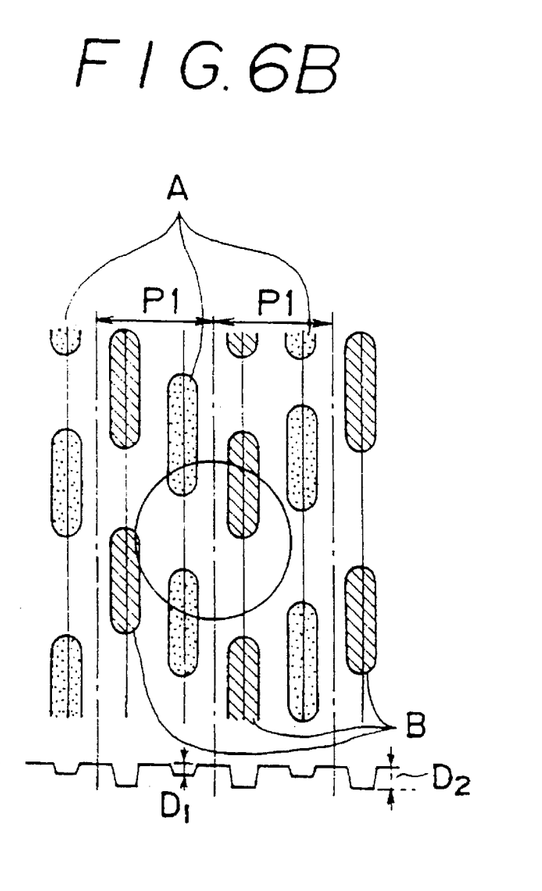
FIG. 6B is a view illustrating pit arrangement of an optical disk according to the present invention.

FIG. 6A illustrates pit arrangement of a conventional optical disc, and FIG. 6B illustrates pit arrangement of an optical disk according to the present invention. In a conventional optical disk, information is expressed as length of information pits. Namely, information pits having length corresponding to information to be recorded are formed on the optical disk. As is apparent from FIGS. 4A and 5A, when pit length is varied (i.e., aspect ratio is varied), polarization ellipticity varies but direction of major axis of elliptically-polarized light maintains constant direction. Namely, conventional optical disk is provided only with pit array which produces elliptically-polarized light having a constant major axis direction. On the other hand, in an optical disk of the present invention shown in FIG. 6B, two different kinds of pit arrays, pit array A and pit array B, are alternately formed in radial direction of disk. On the pit array A information pits having depth $D_1$ are formed, and on the pit array B information pits having depth $D_2$ are formed (see. FIG. 6B). The depths of the information pits on the arrays A and B are determined so that major axis directions of elliptically-polarized light produced by the respective information pits are different by 45 degrees. By referring to FIG. 5B, for example, if the depth $D_1$ of the information pits on the array A is determined to be 0.08 [μm], the depth $D_2$ of the information pits on the array B should be determined to be 0.16 [μm]. By determining the pit depths in this manner, directions of major axes of the elliptically-polarized lights become different by 45 degrees from each other.

Figure 7:
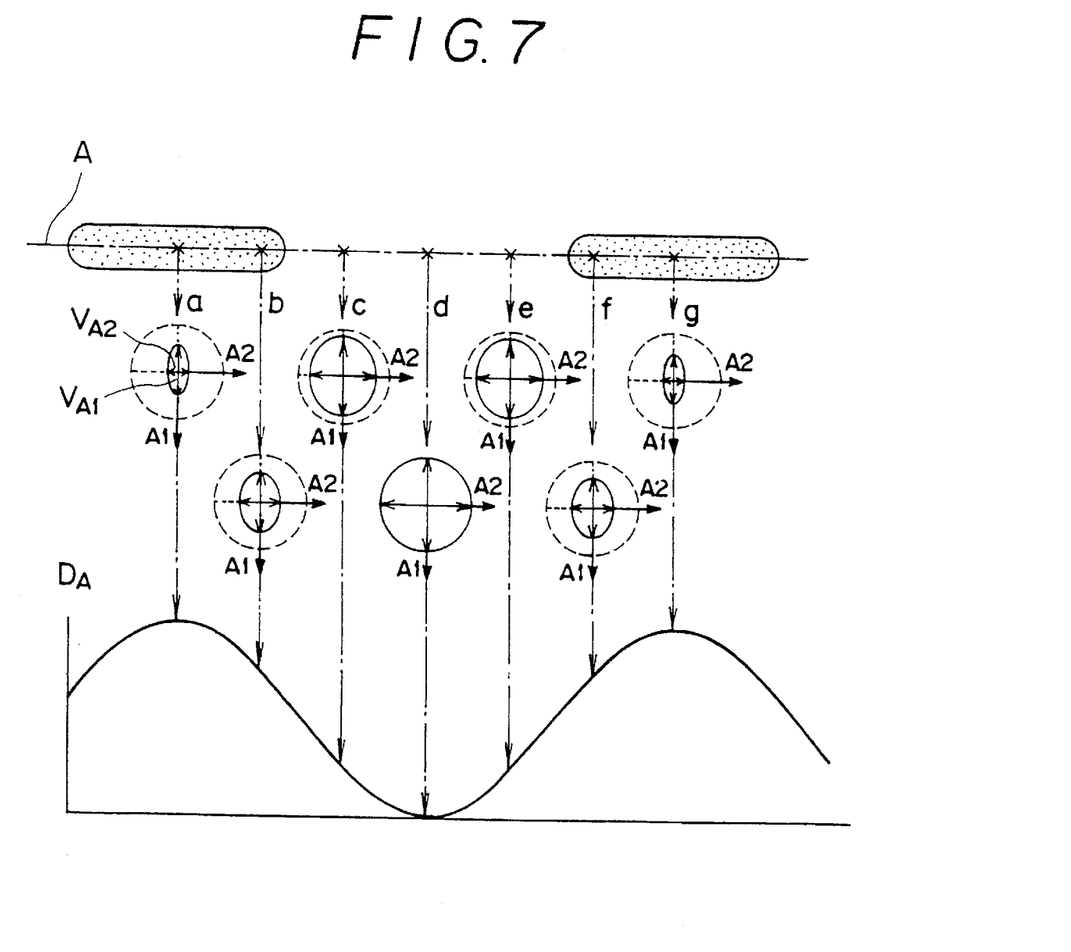
FIG. 7 is a diagram illustrating polarization state of circularly-polarized light irradiated on and reflected by the pit array A shown in FIG. 6B.

FIG. 7 illustrates polarization states of circularly-polarized lights irradiated on and reflected by the pit array A. As shown in FIG. 7, when circularly-polarized light is irradiated on the pit array A, the light irradiated on and reflected by the portions a or g located on the information pits becomes elliptically-polarized light, the major axis of which being directed to a direction A1 determined in correspondence with the depth $D_1$ of the information pit (see. FIG. 6B). At the intermediate portion d where the disk surface is nearly mirror-finished, the circularly-polarized light is reflected as it is (not elliptically polarized). At the other portions b, c, e and f, polarization state of the reflected light is determined depending upon a ratio of pit portion and mirror-finished portion within the light spot, respectively, as illustrated in FIG. 7. FIG. 7 further shows a waveform, at its bottom, of a signal $D_A$ indicative of difference between a light component $V_{A1}$ of the elliptically-polarized light in major axis direction A1 and a light component $V_{A2}$ of the elliptically-polarized light in minor axis direction A2 perpendicular to the major axis direction A1. As seen from FIG. 7, the waveform of the signal $D_A$ are representative of presence and absence of the information pits on the pit array A.

Figure 8:
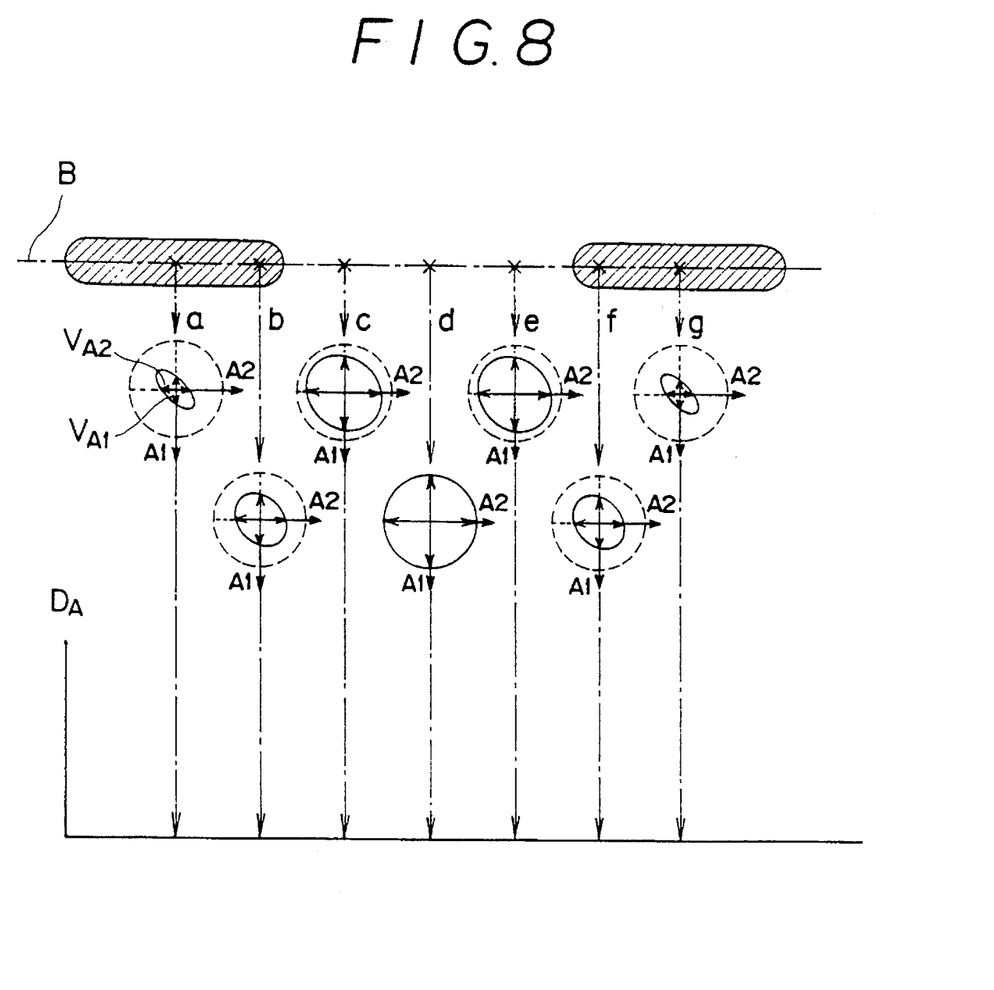
FIGS. 8 and 9 are diagrams illustrating polarization states of circularly-polarized lights irradiated on and reflected by the pit array B shown in FIG. 6B.
Figure 9:
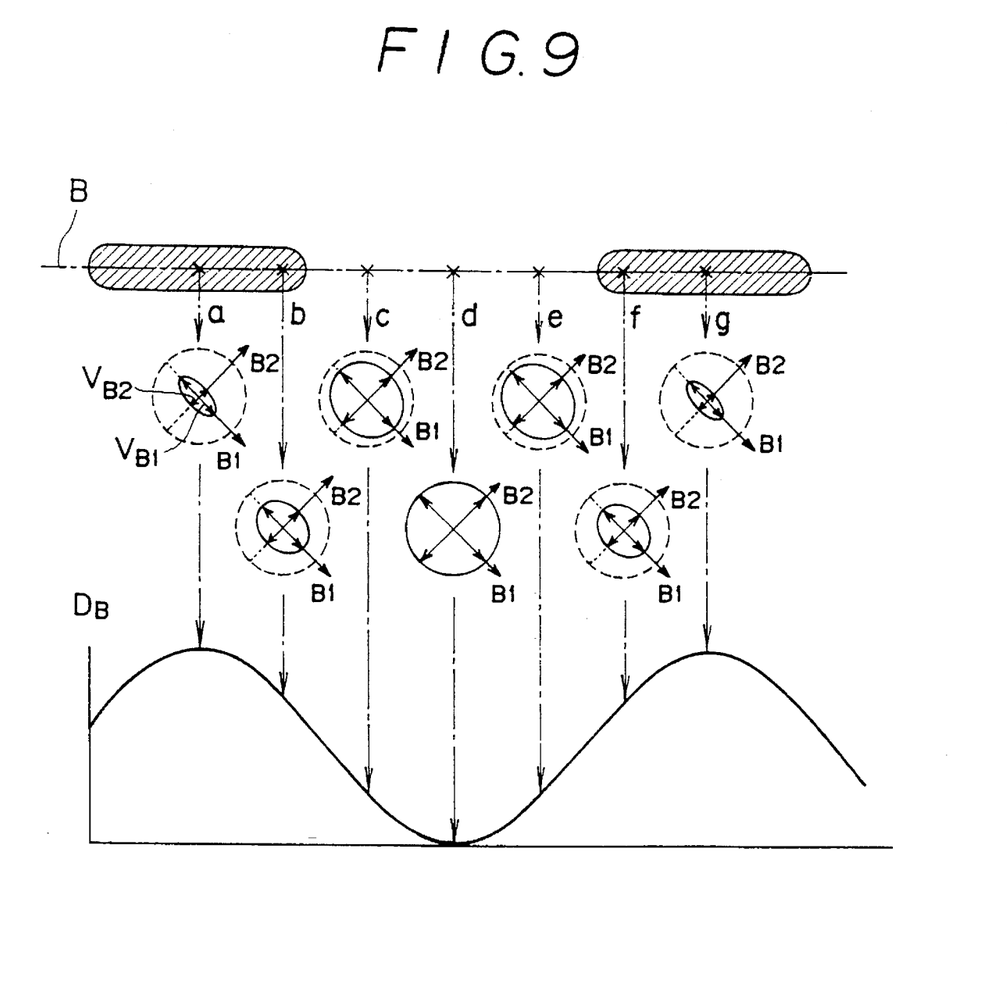

FIGS. 8 and 9 illustrate polarization states of circularly-polarized lights irradiated on and reflected by the pit array B. Information pits on the pit array B shown in FIGS. 8 and 9 have pit depth different from that of the information pit on the pit array A shown in FIG. 7, so that the information pit on the pit array B produces elliptically-polarized light whose major axis direction B1 is rotated by 45 degrees with respect to that of the elliptically-polarized light produced by the information pits on the pit array A. An exemplary manner of determining specific depths of the information pits on the pit arrays A and B has been suggested (see. $D_1$ and $D_2$ in FIG. 6B). As shown in FIGS. 8 and 9, when circularly-polarized light is irradiated on the pit array B, the light irradiated on and reflected by the portions a or g on the information pits becomes elliptically-polarized light, the major axis of which being directed to a direction B1 determined in correspondence with the depth $D_2$ of the information pit. It is noted, however, that the major axis direction B1 of the elliptically-polarized light produced by the pit array B is different, by 45 degrees, from that of the polarized light produced by the pit array A. At the intermediate portion d where the disk surface is nearly mirror-finished, the circularly-polarized light is reflected as it is (not elliptically polarized). At the other portions b, c, e and f, polarization state of the reflected light is determined depending upon a ratio of pit portion and mirror-finished portion within the light spot, respectively, as illustrated in FIGS. 8 and 9. FIG. 8 further shows a waveform, in the same manner as FIG. 7, of a signal $D_B$ indicative of difference between light component $V_{A1}$ and $V_{A2}$ in the same directions as that of FIG. 7. However, in the case of pit array B, the light component $V_{A1}$ is equal to the light component $V_{A2}$, as seen from FIG. 8, and therefore signal corresponding to presence or absence of information pits cannot be obtained. In this view, a light component $V_{B1}$ of the elliptically-polarized light in major axis direction B1 thereof and a light component $V_{B2}$ of the elliptically-polarized in minor axis direction B2 perpendicular to the major axis direction B1 are detected and the difference $D_B$ is calculated, as illustrated in FIG. 9, thereby signal representative of presence and absence of the information pits on the pit array B is obtained.

As described above, according to the present invention, two pit arrays A and B having different depths are formed so that major axis directions of elliptically-polarized lights produced by the pit respective arrays are different, by 45 degrees, from each other. Therefore, information recorded on the pit array A can be read out by detecting the light components $V_{A1}$ and $V_{A2}$ and calculating the difference $D_A$, but information recorded on the pit array B cannot be read out by the same manner, i.e., obtaining the difference $D_A$ for the pit array B. Similarly, information recorded on the pit array B can be read out by detecting the light components $V_{B1}$ and $V_{B2}$ and calculating the difference $D_B$, but information recorded on the pit array A cannot be read out by the same manner, i.e., obtaining the difference $D_B$ for the pit array A. Namely, although the pit array B is formed between the pit arrays A formed with a conventional track pitch $P_1$, only information recorded on the pit array A can be read out, by measuring the difference $D_A$, without interference or crosstalk from the pit array B. This is true for the pit array B. That is, only information recorded on the pit array B can be read out, by measuring the difference $D_B$, without interference or crosstalk from the pit array A. In the following description, a pair of pit arrays A and B will be referred to as "coupled pit array".

Figure 10:
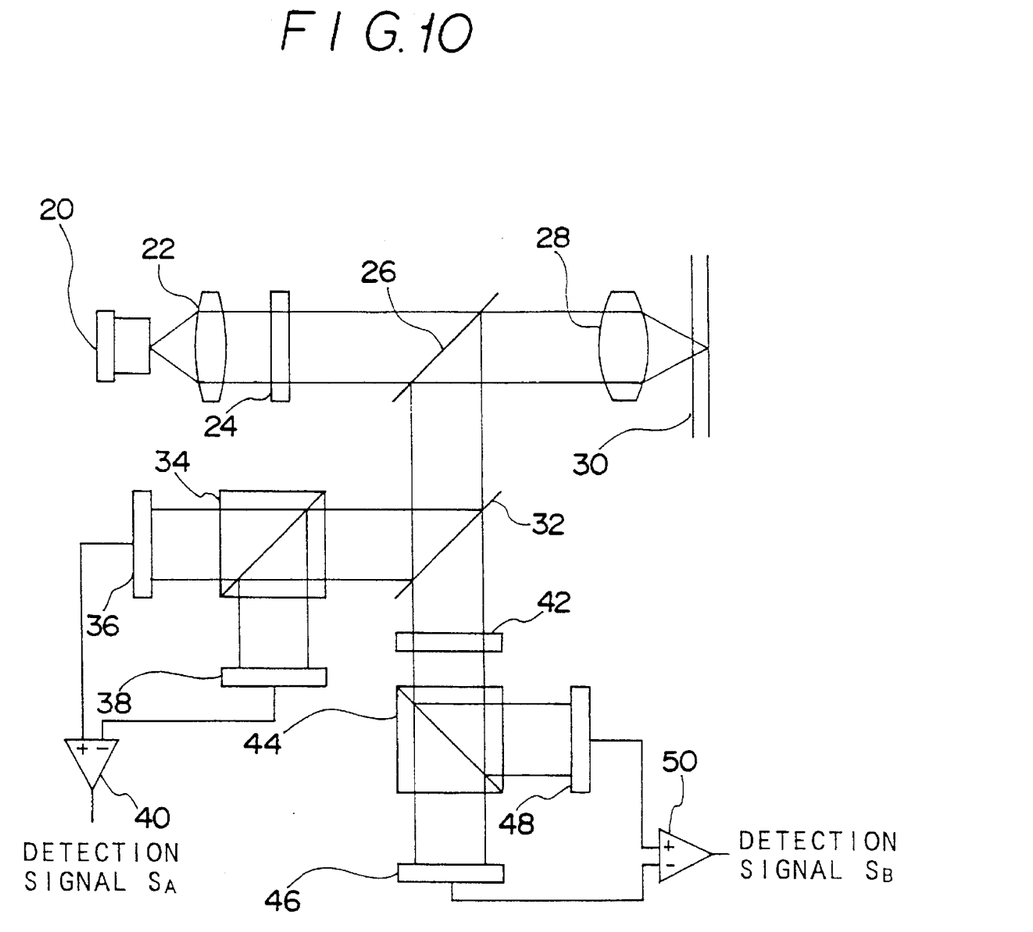
FIG. 10 is a diagram illustrating construction of an apparatus for reproducing information from an optical disk according to the present invention.

Next, an apparatus for reproducing information from the optical disk will be described. FIG. 10 illustrates a construction of an apparatus for reproducing information from the above described optical disk. Namely, polarization state of light reflected by the optical disk is detected by this apparatus. It is noted that detection system of this apparatus is substantially the same as that of reproduction apparatus for magneto-optical disk, the details of which being disclosed in a document "fundamental construction and principle of magneto-optical disk", pages 28–33, ELECTRONIC MATERIALS, issued on July 1988, for example.

Referring to FIG. 10, laser light emitted by semiconductor laser 20 is converted into a parallel light by collimator lens 22, and then circularly polarized by ¼ wave plate 24. The circularly-polarized light passes through half-mirror 26, and then converged on the surface of disk 30 by objective lens 28. The light reflected by the disk surface again propagates through the objective lens 28 to the half mirror 26. A portion of light reflected by the optical disk 30 and passed through the objective lens 28 is reflected by the half mirror 26 and half mirror 32, and then propagates to polarization beam splitter 34. A light component $V_{A1}$ in the major axis direction A1 of the elliptically-polarized light produced by the pit array A passes through the polarization surface of the polarization beam splitter 34 and is detected by photodetector 36. Simultaneously, a light component $V_{A2}$ in the minor axis direction A2 of the elliptically-polarized light produced by the pit array A is reflected by the polarization surface of the polarization beam splitter 34 and is detected by photodetector 38. Two light components $V_{A1}$ and $V_{A2}$ detected by the photodetectors 36 and 38, respectively, are supplied to differential amplifier 40 to calculate difference $D_A$ between them and output it as detection signal $S_A$.

The other portion of light reflected by the optical disk 30 and passed through the objective lens 28 is reflected by the half mirror 26, passes through the half mirror 32, and then propagates to polarization beam splitter 44 after passing through optical rotatory element 42. The optical rotatory element 42 rotates the major axis direction of the incident elliptically-polarized light by 45 degrees, i.e., to be the direction of B1 in FIGS. 8 and 9. A light component $V_{B1}$ in the major axis direction B1 of the elliptically-polarized light produced by the pit array B passes through the polarization surface of the polarization beam splitter 44 and is detected by photodetector 46. Simultaneously, a light component $V_{B2}$ in the minor axis direction B2 of the elliptically-polarized light produced by the pit array B is reflected by the polarization surface of the polarization beam splitter 44 and is detected by photodetector 48. Two light components $V_{B1}$ and $V_{B2}$ detected by the photodetectors 46 and 48, respectively, are supplied to differential amplifier 50 to calculate difference $D_B$ between them and output it as detection signal $S_B$. As a result, the apparatus shown in FIG. 10 outputs information recorded on the pit array A as the detection signal $S_A$ and information recorded on the pit array B as the detection signal $S_B$.

According to calculation using pits shown in FIG. 6B as models, recorded information can be read out when the following conditions are satisfied:

<Beam Parameter Used>

Wavelength: 780 nm,

NA: 0.45,

<Disk>

Pit width: 0.4 μm,

Pit depth: 0.1 μm (0.19λ), 0.18 μm (0.35λ),

Interval of coupled pit arrays: 1.6 μm,

Interval between pit arrays A and B: 0.8 μm.

The above description is directed to information pits formed on read-only type disk. However, the present invention is applicable to rewritable disk such as magneto-optical disk or phase-change type disk by recording information in two different marks so that major axis directions of each of the marks are different from each other by 45 degrees.

As described above, according to the present invention, two pit arrays A and B having different depth are formed alternately so that major axis direction of the polarized light produced by the respective pit arrays A and B are different from each other by 45 degrees. Information recorded on the pit array A can be read out by detecting light components $V_{A1}$ and $V_{A2}$ measured in a first major axis direction A1 and a first minor axis direction A2 perpendicular to the first major axis direction A1, but cannot be read out by detecting light component in a second major axis direction B1 rotated by 45 degrees with respect to the first major axis direction A1 and a second minor axis direction B2 perpendicular thereto. Similarly, information recorded on the pit array B can be read out by detecting light components measured in the second major axis direction B1 and second minor axis direction B2, but cannot be read out by detecting light components in the first major axis direction A1 and first minor axis direction A2. In other words, pit arrays adjacently formed do not interfere with each other in reproduction, and no crosstalk is produced between them. Therefore, by forming coupled pit arrays (pit arrays A and B) on an optical disk with conventional track pitches, recording density may be doubled. Further, when a laser light is positioned to cover pits on the both pit arrays, information recorded on the both pit arrays can be simultaneously read out. Namely, according to the present invention, information recorded on the two pit arrays can be read out simultaneously by a unique light beam, thereby doubling information transmission rate.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. An optical disk comprising:

an information recording surface;

first surface-transformed portion array formed on said information recording surface and comprising first surface-transformed portions transformed in shapes, said first surface-transformed portion reflecting a laser light, when said laser light is irradiated thereon, polarized in accordance with the transformed shape thereof so that major axis of the polarized light is oriented to a first direction; and second surface-transformed portion array formed on said information recording surface and comprising second surface-transformed portions transformed in shapes, said second surface-transformed portion reflecting a laser light, when said laser light is irradiated thereon, polarized in accordance with the transformed shape thereof so that major axis of the polarized light is oriented to a second direction, wherein the first surface-transformed portion array and the second surface-transformed portion array are formed alternately in a radial direction of said optical disk, and the first direction and the second direction differ from each other by 45 degrees.

2. An optical disk according to claim 1, wherein said first surface-transformed portion comprises information pit having a first predetermined depth, and said second surface-transformed portion comprises information pit having a second predetermined depth different from the first predetermined depth.

3. An optical disk according to claim 2, wherein said first and second surface-transformed portions comprise information pits having pit lengths corresponding to information to be recorded.

4. An optical disk according to claim 1, wherein said surface-transformed portion arrays are formed to have predetermined intervals with each other in the radial direction of the optical disk.

5. An optical disk according to claim 1, wherein each of said surface-transformed arrays is spirally formed.

6. In combination an optical disk and an apparatus for reproducing information from said optical disk, said optical disk comprising:

an information recording surface;

a first surface-transformed portion array formed on said information recording surface and comprising first surface-transformed portions transformed in shapes, said first surface-transformed portion reflecting a laser light, when said laser light is irradiated thereon, polarized in accordance with the transformed shape thereof so that major axis of the polarized light is oriented to a first direction; and second surface-transformed portion array formed on said information recording surface and comprising second surface-transformed portions transformed in shapes, said second surface-transformed portion reflecting a laser light, when said laser light is irradiated thereon, polarized in accordance with the transformed shape thereof so that major axis of the polarized light is oriented to a second direction, the first surface-transformed portion array and the second surface-transformed portion array being formed alternately in a radial direction of said optical disk, and the first direction and the second direction differing from each other by 45 degrees; and said apparatus comprising:

laser light irradiating means for irradiating the laser light onto the information recording surface;

light separating means for separating the polarized light reflected by the information recording surface into the polarized light having major axis oriented to the first direction and the polarized light having major axis oriented to the second direction;

first photodetecting means for detecting, from the polarized light having major axis oriented to the first direction, light component of the first direction and light component of a direction perpendicular to the first direction;

second photodetecting means for detecting, from the polarized light having major axis oriented to the second direction, light component of the second direction and light component of a direction perpendicular to the second direction;

first operation means for obtaining information recorded on the first surface-transformed portion array from the light components detected by the first photodetecting means; and second operation means for obtaining information recorded on the second surface-transformed portion array from the light components detected by the second photodetecting means.

7. An apparatus according to claim 6, wherein said laser light irradiating means irradiates a laser light onto the information recording surface so that a light spot formed by the laser light simultaneously covers one first surface-transformed portion array and one second surface-transformed portion arrays.

8. An apparatus according to claim 6, wherein each of the first and the second photodetecting means comprises a differential amplifier for calculating difference between the two light components, respectively.

* * * * *